United States Patent [19]

Bunn, Jr. et al.

[11] 4,056,486

[45] Nov. 1, 1977

[54] FLUIDIZED CATALYTIC CRACKING REGENERATION PROCESS

[75] Inventors: Dorrance P. Bunn, Jr.; John C. Strickland; Douglas H. May, Jr., all of Houston, Tex.

[73] Assignee: Texaco Inc., New York, N.Y.

[21] Appl. No.: 684,439

[22] Filed: May 7, 1976

[51] Int. Cl.² .................... B01J 29/38; B01J 21/20; C10G 11/18

[52] U.S. Cl. .................... 252/417; 23/288 B; 23/288 S; 208/120; 208/164; 252/419

[58] Field of Search .............. 252/417, 419; 208/113, 208/120, 164; 23/288 B

[56] References Cited

U.S. PATENT DOCUMENTS

| | | | |
|---|---|---|---|
| 2,327,175 | 8/1943 | Conn | 252/417 |
| 2,382,382 | 8/1945 | Carlsmith et al. | 252/417 |
| 3,886,060 | 5/1975 | Owen | 208/120 |
| 3,903,016 | 9/1975 | Owen | 252/417 |
| 3,909,392 | 9/1975 | Horecky, Jr. et al. | 208/120 |
| 3,923,642 | 12/1975 | Luckenbach | 208/164 |
| 3,964,876 | 6/1976 | James | 23/288 S |
| 3,974,091 | 8/1976 | Parker et al. | 252/417 |

Primary Examiner—Winston A. Douglas
Assistant Examiner—P. E. Konopka
Attorney, Agent, or Firm—Carl G. Ries; Thomas H. Whaley; Douglas H. May, Jr.

[57] ABSTRACT

A process is described herein for regeneration of spent, coke contaminated fluidized cracking catalyst by burning coke therefrom with a molecular oxygen containing regeneration gas in a fluidized dense phase bed, and for burning substantially all carbon monoxide formed to carbon dioxide. A method is provided for supplying additional oxygen to a dilute phase above the dense phase bed for combustion of carbon monoxide. Additionally, a method is provided for transferring heat from the dilute phase back to the bottom of the fluidized dense phase bed.

8 Claims, 1 Drawing Figure

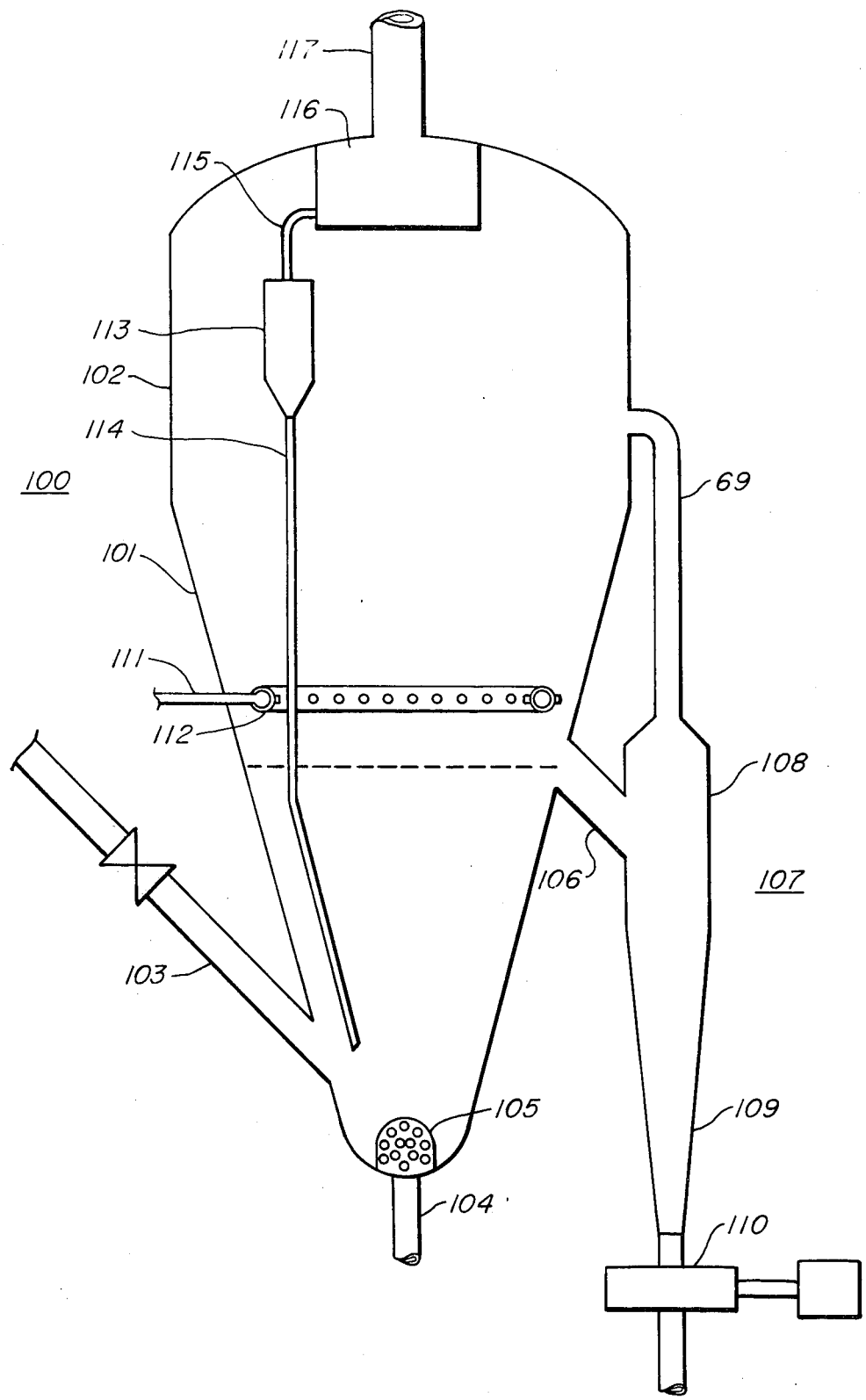

FLUIDIZED CATALYTIC CRACKING REGENERATION PROCESS

The present invention relates to fluidized catalytic cracking of hydrocarbons. In particular, the present invention relates to a process for regeneration of zeolitic molecular sieve containing fluidizable catalytic cracking catalyst.

Fluidized catalytic cracking processes are well known and widely practiced in petroleum refineries. Such processes comprise contacting hydrocarbon charge with hot regenerated fluidized cracking catalyst in a reaction zone under cracking conditions for conversion of the hydrocarbon charge into cracked hydrocarbon products with the concomitant deposition of carbonaceous materials (coke) upon the catalyst; separating cracked hydrocarbon vapors from the coke contaminated catalyst (spent catalyst) within the reaction zone; recovering as product the cracked hydrocarbon vapors essentially free of entrained catalyst; stripping in a stripping zone, volatile hydrocarbons from the spent catalyst by contact with stripping vapors; regenerating, in a regeneration zone, the coke contaminated stripped catalyst by burning coke therefrom with a molecular oxygen containing regeneration gas at an elevated temperature for restoring activity to the regenerated catalyst; and contacting hot, regenerated catalyst with additional hydrocarbon charge in the reaction zone, as described above.

In fluidized catalytic cracking processes for conversion of normally liquid hydrocarbons, such as petroleum fractions, into lower boiling hydrocarbons, it is well known to employ catalysts comprising zeolitic aluminosilicate molecular sieves to obtain increased conversion of hydrocarbon charge into useful, lower boiling hydrocarbons, particularly into naphtha fractions useful as motor fuels. Such catalysts comprise an amorphous matrix such as silica-alumina, silica-magnesia, etc. containing a minor portion of a crystalline zeolytic aluminosilicate molecular sieve having uniform crystalline port openings which has been ion exchanged with rare earth ions, magnesium ions, hydrogen ions, ammonium ions and/or other divalent and polyvalent ions for reduction of the sodium content of said molecular sieve to not more than one weight percent, and preferably less. These cracking catalysts (hereinafter referred to as "zeolite catalysts") are well-known and commercially available. The activity and selectivity of such zeolite catalysts for conversion of hydrocarbon charge stocks into useful cracked hydrocarbon products, particularly naphtha, are particularly affected by residual carbon remaining on regenerated catalyst. For obtaining the full utility and benefit of the activity and selectivity of such zeolite catalysts, carbon on regenerated catalyst is maintained below 0.2 weight percent, and preferably 0.07 weight percent or less.

SUMMARY OF THE INVENTION

Now, according to the present invention an improved process is disclosed for regeneration of spent, coke contaminated zeolite cracking catalysts, by burning coke therefrom with a molecular oxygen containing regeneration gas to produce a flue gas comprising oxides of carbon and regenerated catalyst containing 0.1 weight percent or less residual carbon.

In a preferred embodiment, the fluidized cracking catalyst regeneration process of the present invention comprises:

a. contacting spent, coke-contaminated cracking catalyst from a reaction zone with a molecular oxygen containing primary regeneration gas, in the bottom portion of a first vertical frusto-conical regeneration zone, at regeneration conditions, wherein the flow rate of said primary regeneration gas is sufficient to provide about the stoichometric amount of oxygen required for combustion of coke on said spent catalyst to carbon dioxide and water, and wherein the superficial vapor velocity of regeneration gas is in the range of about 5–8 ft/sec at the bottom, decreasing to about 2.5–4.5 ft/sec at the top of said first regeneration zone such that a fluidized dense phase bed of catalyst, having an upper surface, is established in said first regeneration zone;

b. maintaining catalyst undergoing regeneration in said fluidized dense phase bed for a residence time of about 3–20 minutes for burning substantially all the coke therefrom;

c. withdrawing, regenerated catalyst from the upper portion of said fluidized dense phase bed for contact with hydrocarbon charge in said reaction zone;

d. flowing regeneration gas depleted in oxygen and comprising oxides of carbon, containing entrained catalyst from the upper surface of said fluidized dense phase bed, into the bottom of a second frusto-conical regeneration zone at a superficial vapor velocity of about 2.5–4.5 ft/sec decreasing to about 1.0–2.2 ft/sec at the top of said second regeneration zone such that a major portion of said entrained catalyst returns to the upper surface of said fluidized dense phase bed under the influence of gravity and a minor portion of said entrained catalyst exits the top of said second regeneration zone with said spent regeneration gas as a dilute phase;

e. radially distributing a molecular oxygen containing secondary regeneration gas into said second regeneration zone in an amount equivalent to about 1–10 percent of said primary regeneration gas for burning substantially all the carbon monoxide in said spent regeneration gas into carbon dioxide;

f. flowing said dilute phase from the top of said second regeneration zone into an cylindrical third regeneration zone at a superficial vapor velocity of about 1.5–2.2 ft/sec;

g. separating, in a separation zone, said dilute phase into separated catalyst and a flue gas substantially free of carbon monoxide and essentially free of entrained catalyst;

h. venting said flue gas from said separation zone; and i. flowing said separated catalyst from said separation zone to the bottom of said first regeneration zone for contact with spent catalyst and primary regeneration gas entering said first regeneration zone.

Advantages of the improved fluidized cracking catalyst regeneration process of the present invention include regeneration of said catalyst to a residual carbon content of about 0.1 wt. percent or less, combustion of substantially all the carbon monoxide formed to carbon dioxide, reduction of the volume of catalyst maintained in the fluidized dense phase bed, transfer of a substantial amount of the heat of combustion of burning carbon monoxide from said second regeneration zone by entrained catalyst settling back to said fluidized dense phase bed, and transfer of a substantial amount of heat from said third regeneration zone to said spent catalyst and primary regeneration gas by said separated catalyst return to the bottom of said first regeneration zone. These and other advantages of the present invention will be further discussed in the Detailed Description of the Invention, which follows.

BRIEF DESCRIPTION OF THE DRAWING

The Drawing is a schematic representation of fluidized catalytic cracking regeneration process equipment embodying improvements of the present invention.

DETAILED DESCRIPTION OF THE DRAWING

In order to demonstrate and provide a better understanding of the invention, reference now made to the Drawing. The Drawing is a schematic representation of fluidized catalytic cracking regeneration process equipment embodying improvements of the present invention. It is to be understood that the Drawing is only in such detail as required for a clear understanding of the present invention, and that various elements commonly employed in commercial apparatus, such as valves, pumps, instrumentation, etc. which are unnecessary for a complete description of the present invention have been omitted for the sake of clarity.

In the Drawing, fluidized cracking catalyst regeneration process equipment is shown, including a vertical regeneration vessel 100 comprising a lower regenerator section 101 which comprises a frusto-conic section having a downward facing apex, a closed bottom and an open top; and an upper regenerator section 102, comprising a hollow cylinder having a closed top and an open bottom in axial alignment and in communication with the open top of lower regenerator section 101. Spent coke-contaminated catalyst is contacted with an oxygen containing primary regeneration gas near the bottom of lower regenerator section 101, under regeneration conditions such that a dense phase fluidized bed of catalyst undergoing regeneration is formed, and above the top surface of this dense phase fluidized catalyst bed, a dilute phase of catalyst entrained in spent regeneration gas is formed. The bottom cross-section area of lower regenerator section 101 is sufficient to provide a primary regeneration gas superficial vapor velocity in the range of about 5 to 8 ft/sec, and the volume of lower regenerator section 101 is sufficient to provide a catalyst residence time in the fluidized dense phase bed of from about 3 minutes to about 20 minutes.

The wall of lower regenerator section 101 has a conic angle of about 20° to 30° from the vertical, preferably about 21° such that the cross-section area of lower regenerator section 101 increases with height. Within lower regenerator section 101, the superficial vapor velocity of upward flowing regeneration gas decreases with height, such that at the top of the fluidized dense phase catalyst bed the regeneration gas superficial vapor velocity is in the range of 2.5 to 4.5 ft/sec, and at the open top of lower regeneration section 101, regeneration gas superficial vapor velocity is in the range of 1.0–2.2 ft/sec, as will be described in further detail below. Upper regenerator section 102 is of the same diameter and cross-sectional area as the top of lower regenerator section 101.

In the Drawing, a spent catalyst conduit means 103 for introducing spent, coke contaminated catalyst from a reaction section (not shown) into the bottom portion of regenerator section 101, comprises a spent catalyst conduit 103 directed downward at an angle of about 30° to 45° from the vertical, the discharge end of which is attached to and in communication with the interior of lower regenerator section 101. In one embodiment, said spent catalyst conduit means 103 may comprise a conduit of essentially constant circular cross-sectional area for flowing spent catalyst into the bottom portion of lower regenerator section 101. In a second embodiment, said spent catalyst conduit means 103 may comprise a conduit of substantially constant circular cross-sectional area, expanding near the discharge end thereof into an oval cross-sectional area wherein the vertical diameter is equivalent to the diameter of said circular cross-section, and wherein the horizontal diameter is equivalent to one-half to 1 diameter of the bottom of lower regenerator section 101.

In the Drawing, a primary regeneration gas conduit 104 passes upward through the bottom of lower regenerator section 101 as means for introducing molecular oxygen containing primary regeneration gas, e.g. air, into regenerator vessel 100. The discharge end of primary regeneration gas conduit 104 is in communication with a primary regeneration gas distribution means which comprises an inlet gas plenum 105 having a plurality of opening therein. Said inlet gas plenum 105 is attached to the interior bottom of lower regenerator section 101. The total cross-sectional area of the plurality of openings in inlet gas plenum 105 is sufficient for providing a primary regeneration gas discharge velocity in the range of 65–175 ft/sec, such that primary regeneration gas and spent catalyst entering the bottom of lower regenerator section are intimately mixed under turbulent flow conditions.

In the Drawing, inlet gas plenum 105 comprises a hollow, vertical cylindrical member having a closed bottom and a domed top. The plurality of openings for primary regeneration gas discharge are symetrically spaced around said inlet gas plenum for even distribution of primary regeneration gas into the bottom of lower regenerator section 101. The discharge end of primary regeneration gas conduit 104 is attached to and in communication with the bottom interior of inlet gas plenum 105.

In the Drawing, a regenerated catalyst ductway 106 communicates between the interior of lower regenerator section 101 and an external regenerated catalyst standpipe 107. Regenerated catalyst ductway 106 communicates with said lower regenerator section 101 at an elevation below the top of the fluidized dense phase catalyst bed, and is inclined downward at an angle in the range of about 30° to 60° from the vertical such that regenerated catalyst from the upper portion of the fluidized dense phase catalyst bed maintained in lower regenerator section 101 will flow downwardly through regenerated catalyst ductway 106 into the upper portion of external regenerated catalyst standpipe 107. Regenerated catalyst standpipe 107 comprises an upper vertical cylindrical section 108 having a cylindrical wall, an opening in the top and an open bottom and a lower frusto-conical section 109 having an open top and open bottom. Communication of regenerated catalyst ductway 106 with upper standpipe section 108 is through the vertical cylinder wall of upper standpipe section 108. The open top of lower standpipe section 109 is in communication with the open bottom of upper standpipe section 108, and the wall of lower standpipe section 109 has a conical angle of about 7 ½° from the vertical. Within said lower standpipe section 109 regenerated catalyst from regenerator vessel 100 is accumulated and deaerated to from a bed of hot, deaerated, regenerated catalyst superposed by separated deaeration gas. A slide valve 110, in communication with the bottom of lower standpipe section 109 allows withdrawal of hot, deaerated, regenerated catalyst at a controlled rate for contact with a hydrocarbon charge stock in a fluidized catalytic cracking reaction section (not shown).

In the Drawing, gas entering regenerated catalyst standpipe 107 with regenerated catalyst from reactor vessel 100 accumulates in upper standpipe section 107. A deaeration gas conduit 69 is in communication between opening in the top of upper standpipe section 108 and upper regenerator section 102 for removing such accumulated deaeration gas from regenerated catalyst standpipe 107 to the upper portion of reactor vessel 100.

In the Drawing, a secondary regeneration gas conduit 111 passes through the wall of lower regenerator section 101 as means for introducing molecular oxygen containing secondary regeneration gas, e.g. air, into regenerator vessel 100. The discharge end of secondary regeneration gas conduit 111 is in communication with a secondary regeneration gas distribution means 112. Secondary regeneration gas distribution means 112 comprises a header having a plurality of openings for radially distributing secondary regeneration gas into the upper portion of lower regenerator section 101 at an elevation above the top of the fluidized dense phase catalyst bed. Preferably, secondary regeneration gas distribution means 112 comprise a pipe forming a ring horizontally disposed within said upper portion of lower regenerator section 101, wherein the cross-sectional area of lower regenerator section included within the diameter of said pipe ring 112 is substantially equivalent to the cross-sectional area of lower regenerator section 101 which is outside the periphery of pipe ring 112. Pipe ring 112 has a plurality of openings directed outward at an angle of about +20° from the horizontal disposed about the outer periphery pipe ring 112, and a plurality of openings directed inward at an angle of about +20° from the horizontal disposed about the inner periphery of pipe ring 112 for radial distribution of secondary regeneration gas into lower regenerator section 101. The total cross-sectional area of the plurality of openings in pipe ring 112, is sufficient to provide a secondary regeneration gas discharge velocity in the range of 65-175 ft/sec when the secondary regeneration gas rate is equivalent to about 1-10 percent of the primary regeneration gas rate. Pipe ring 112 is horizontally disposed within lower regenerator section 101 above the top of the fluidized dense phase catalyst bed at an elevation at which the superficial vapor velocity of secondary and primary regeneration gas flowing upward in lower regenerator section 101 is within the range of about 1.5-3.6 ft/sec.

In the Drawing, as previously stated, the open top of lower regenerator section 101 has a diameter sufficient for providing a regeneration gas superficial vapor velocity in the range of about 1.0 to 2.2 ft/sec. and in communication with the open bottom of upper regenerator section 102 for allowing flow of regeneration gas and entrained catalyst from the upper surface of the fluidized dense phase catalyst bed maintained in lower regenerated section 101 into upper regenerator section 102, wherein a dilute phase of catalyst suspended in regeneration gas is maintained. Regeneration gas disengaging the fluidized dense phase catalyst bed may be substantially depleted in oxygen, and may contain a substantial concentration of carbon monoxide from incomplete combustion of coke in the fluidized dense phase bed. Such carbon monoxide is desirably combusted to carbon dioxide in regenerator vessel 100. With the upper portion of lower regenerator section 101, secondary regeneration gas distributor 112 is positioned horizontally for injection of additional oxygen containing regeneration gas for substantially complete combustion of carbon monoxide to carbon dioxide.

In the Drawing, the open top of lower regenerator section 101 is in communication with the open bottom of upper regeneration section 102 for flowing regeneration gas and entrained catalyst into the dilute catalyst phase maintained in upper regenerator section 102. The cross-sectional area of upper regenerator section 102 is such that the superficial vapor velocity of gas flowing therethrough is in the range of about 1.0 to 2.5 ft/sec. Within upper regenerator section 102, catalyst-gas separation means 113, preferably cyclone separators, are provided for separating entrained catalyst from spent regeneration gas. Within the present invention, it is contemplated that catalyst-gas separation means 113 may may comprise one or more cyclone separators in series and/or parallel arrangement for substantially completely separating entrained catalyst from spent regeneration gas. For the purposes of clarity, only one separator 113 is shown. Line 114, in communication with the bottom of separator 113 extends downward into lower regenerator section 101, terminating at about the point spent catalyst discharges from spent catalyst distributor 103. Entrained catalyst, separated from spent regeneration gas in separator 113 flows downward at regeneration temperatures through line 114 and discharges into the bottom of lower regeneration section 101 wherein the hot catalyst mixes with spent catalyst and primary regeneration gas, increasing the temperature thereof and improving the initiation of coke burning on the spent catalyst.

In the drawing, Line 115 communicates from the top of separator 113 to a plenum 116. Plenum 116 is attached to the top of upper regenerator section 103. Spent regeneration gas, separated from entrained catalyst in catalyst-gas separator 113 flows through line 116 into plenum 116. A vent line 117 communicating with plenum 116 provides means for removing spent regeneration gas from the fluidized catalytic cracking unit as a flue gas.

Fluidized catalytic cracking units employing the improved regeneration apparatus of the present invention are operated for the conversion of hydrocarbon charge stock into lower boiling cracked hydrocarbons and coke. Such conversion of hydrocarbon charge is accomplished by contacting hydrocarbon charge with hot regenerated catalyst under cracking conditions in a fluidized catalytic cracking reaction zone. Hydrocarbon charge and regenerated catalyst may be contacted in a riser transport reactor, in a reactor vessel containing a dense phase fluidized bed of catalyst fluidized by the up-flowing hydrocarbon charge vapors, or in a reactor zone comprising both a riser transport zone and a dense phase catalyst bed. Reaction conditions for conversion of hydrocarbon charge include reaction temperatures in the range of about 850°-1100° F, reaction pressures in the range of 5-50 psig or higher, regenerated catalyst to hydrocarbon charge weight ratios (catalyst/oil ratios) of from about 2:1 to about 20:1, catalyst and hydrocarbon contact times of from about 10 seconds to about 5 minutes, and reactor superficial vapor velocities in the range of about 0.8 to 3.0 ft/sec. In such a fluidized catalytic cracking process, hydrocarbon charge and hot regenerated catalyst are contacted at such reaction conditions for conversion of the hydrocarbon charge into lower molecular weight hydrocarbons. A substantial portion of the hydrocarbons in contact with the catalyst are in vapor phase with a minor portion of being present as liquid phase or solid phase. Such solid and liquid hydrocarbons collect upon the catalyst particles, resulting in a decrease of catalyst activity. Catalyst containing such hydrocarbons is referred to as spent catalyst. In such a fluidized catalytic cracking process spent catalyst is treated for removal of such accumulated hydrocarbons and for regenerating cracking activity. From the reaction zone of a fluidized catalytic process, spent catalyst containing accumulated hydrocarbons is commonly transferred to a stripping zone wherein the spent catalyst is contacted with a stripping vapor (e.g. steam) at a temperature in the range of about 750°-1100° F for vaporization of at least a portion of the volatile hydrocarbons accumulated upon the catalyst. Voltailized hydrocarbons and stripping vapors are transferred from the stripping zone to the reaction zone. Stripped catalyst containing nonvolatile hydrocarbon residues (commonly referred to as coke), is transferred to a regeneration zone wherein catalytic activity is restored to said catalyst by burning such coke from the catalyst with a molecular oxygen containing regeneration gas at an elevated temperature. Upon regeneration, hot regenerated catalyst having restored activity is transferred from the regeneration zone for contact with additional hydrocarbon charge in the reaction zone, as described above.

Catalysts, the regeneration of which the regeneration apparatus of the present invention is well suited, include those catalyst commonly referred to as "zeolite" or "molecular sieve" cracking catalysts. Such catalyst will be referred to herein as zeolite catalyst for convenience in the discussion which follows. Such zeolite catalysts comprise about 95-85 wt. percent amorphous refractory metal oxide matrix, and about 5-15 wt. percent (preferably 8-10 wt. %) crystalline aluminosilicate zeolitic molecular sieves having uniform crystalline pore openings. Said matrix generally has substantial cracking activity and is selected from naturally occuring clays, and synthetic oxide mixtures such as silica-alumina, silica magnesia, silica-zirconia, etc. The zeolite portion of such zeolitic cracking catalyst comprises small particles of either natural or synthetic crystalline, aluminosilicate zeolitic molecular sieves, such as faujasite, chabazite, X-type or Y-type alumino-silicate materials, etc., which have been ion exchanged with magnesium ions, rare earth ions, ammonium ions, hydrogen ions, and/or other divalent and polyvalent ions for reduction of the sodium content of said molecular sieve to not more than one weight percent. The apparatus of the present invention is particularly well suited for use in regenerating those zeolite cracking catalysts promoted for increasing the rate of burning carbon monoxide to carbon dioxide within the regeneration zone. Such promoted zeolite catalysts may have controlled crystalline pore size, and contain small amounts of materials such as plantinium, nickel, iron, and other materials which catalyze the combustion of carbon monoxide to carbon dioxide at temperature commonly employed in the regeneration of catalytic cracking catalyst.

Spent cracking catalyst, when transferred to a regeneration zone, such as described herein, contains from about 0.5 weight percent to about 2.0 weight percent coke. In regenerating such spent catalyst, wherein the coke is burned from the catalyst to restore catalytic activity thereto, zeolite containing cracking catalysts may be subjected to temperatures somewhat above 1325° F without substantially degrading their catalytic activity. At temperatures above about 1500° F, the structure and/or composition of the catalyst is affected in such a way that the catalyst irrevassably losses at least a portion of its catalytic activity.

Regeneration of catalyst in a fluidized catalytic cracking process comprises burning coke therefrom at an elevated temperature with a molecular oxygen containing regeneration gas. Generally, the regeneration gas is air, although other regeneration gases containing molecular oxygen, such as oxygen enriched air, steam and air mixtures, etc. may also be employed. The degree of regeneration of catalytic activity of a spent cracking catalyst is proportional to the degree of removal of coke from said catalyst. Lower residual carbon content of regenerated catalyst results in higher regenerated catalyst activity. The regenerated catalyst activity of zeolite cracking catalyst appears to be somewhat more sensitive to residual carbon than the regenerated activity of an amorphous cracking catalyst. Preferably, residual carbon content of regenerated catalyst is reduced to about 0.1 weight percent or less.

Hydrocarbon charge stocks within contemplation of the present invention are those which may be cracked to yield useful lower molecular weight hydrocarbon products. Examples of hydrocarbon charge stocks include virgin gasoils, vacuum gas oils, atmospheric residua, topped crudes, shale oils, tar sand oils, virgin naphthas, and cycle oil and cracked naphtha recycle streams from cracking processes. A portion of all such hydrocarbon charge stocks when subjected to fluidized catalytic cracking are converted into coke. The proportion of hydrocarbon charge stock which is converted into coke is proportional to the boiling range of the particular charge stock and will vary from about 1 weight percent for some naphthas to about 15 percent or more for some residua.

In a process employing the regeneration apparatus of the present invention, spent cracking catalyst containing about 0.5 to 2.0 weight percent coke is transferred from a reaction zone through spent catalyst conduit means 103 into a first regeneration zone maintained in the bottom of a lower regenerator section 101, wherein said spent catalyst is contacted with an oxygen containing primary regeneration gas flowing into said first regeneration zone under turbulent flow conditions from a primary regeneration gas distributor 105 for intimately mixing said spent catalyst and primary regeneration gas, and evenly distributing the resulting mixture across the bottom cross-sectional area of said first regeneration zone. Primary regeneration gas is supplied to the first regeneration zone in an amount sufficient to provide about the stoichometric amount of molecular oxygen required for complete combustion of coke on the spent catalyst to carbon dioxide and water. Said first regenerator section 101 confines said first regeneration zone to the form of a trunicated cone with a downward facing apex. Spent catalyst entering said first regeneration zone is at a temperature in the range of about 750°-1100° F, and primary regeneration gas entering the first regeneration zone is at a temperature in the range of about 100°-600° F, such that combustion of coke upon spent catalyst is initiated. In said first regeneration zone, spent catalyst and regeneration gas flow upwardly at an initial superficial vapor velocity in the range of about 5 to 8 ft/sec. As the cross-sectional area of said first reaction zone increases, superficial vapor velocity of the primary regeneration gas decreases. In said first regeneration zone, operating conditions are maintained such that a dense phase bed of catalyst undergoing regeneration is fluidized by the upward flow of the primary regeneration gas and wherein substantially all the coke is burned from the catalyst undergoing regeneration. Said dense phase fluidized bed of catalyst has a density in the range of about 20–30 pounds per cubic foot and has an upper surface above which is superimposed a dilute phase of catalyst suspended in regeneration gas. Operating conditions within the first regeneration zone for maintaining the fluidized dense catalyst phase bed and obtaining the degree of regeneration desired, include an initial primary regeneration gas superficial vapor velocity of about 5 to 8 ft/sec. in the bottom of said first regeneration zone, decreasing to about 2.5 to 4.5 ft/sec at the top of the fluidized dense phase bed, temperatures in the range of about 1050°–1350° F, regeneration pressure at the top of the dense phase catalyst bed in the range of about 6–50 psig, catalyst residence time in the dense phase bed in the range of about 3 to 20 minutes, and a specific coke burning rate, based upon the inventory of catalyst in the dense phase bed, in the range of about 0.05 to 1.0 pounds of coke per hour per pound of catalyst. Under these regeneration conditions, residual carbon on regenerated catalyst may be reduced to 0.1 weight percent or preferably 0.05 weight percent or less.

In the present invention, distribution of primary regeneration gas and catalyst in the first regeneration zone is such as to provide an even distribution of primary regeneration gas and catalyst across the cross-sectional area of the first regeneration zone. By this means a homogeneous fluidized dense phase bed of catalyst is established thus providing even regeneration, of catalyst within the first regeneration zone.

In the present invention, regenerated catalyst is withdrawn from the upper portion of the dense phase fluidized catalyst bed below the upper surface of said fluidized catalyst bed via regenerated catalyst ductway 106 which does not have internal projections into said first regeneration zone which may impede the smooth flow of catalyst and vapors within the fluidized dense phase catalyst bed. Regenerated catalyst from said regenerated catalyst ductway 106 flows into a regenerated catalyst standpipe 107 wherein regenerated catalyst disengages regeneration gas entrained therein to form a settled bed of hot regenerated catalyst in the lower standpipe section 107. Hot regenerated catalyst, at a temperature in the range of about 1000° F to 1350° F is transferred from regenerated catalyst standpipe 107 for contact with additional hydrocarbon charge stock in the reaction zone of the fluidized catalytic cracking process. Regeneration gas separated from the regenerated catalyst as a result of deaeration flows from the top of regenerated catalyst standpipe 107 into the dilute catalyst phase which is superimposed above the dense phase fluidized catalyst bed.

In the present invention, regeneration gas comprising nitrogen, carbon dioxide, carbon monoxide, and substantially spent in molecular oxygen, and a small amount of catalyst entrained therein, disengages the upper surface of the fluidized dense phase catalyst bed and flows into a second, frusto-conical shaped regeneration zone in first reactor section 101, wherein the cross-sectional area of the second regeneration zone increases with increasing height such that the superficial vapor velocity of the spent regeneration gas flowing therethrough decreases from about 2.5 to 4.5 ft/sec at the top of said fluidized dense phase catalyst bed to about 1.0 to 2.2 ft/sec at the top of said second regeneration zone. Density of this dilute phase of catalyst suspended in spent regeneration gas is in the range of about 0.1 to 2.0 pounds per cubic foot. Upon decreasing the superficial vapor velocity of spent regeneration gas within the second regeneration zone, substantial amounts of entrained catalyst return, under the influence of gravity, to the top of the dense phase fluidized catalyst bed. The ratio of carbon dioxide to carbon monoxide within spent regeneration gas entering this second regeneration zone may vary from about 1:1 to about 500 to 1 or greater depending upon operating conditions within said fluidized dense phase catalyst bed, and carbon monoxide may comprise from about 50 ppm to about 10 volume percent of said regeneration gas. As carbon monoxide is a serious air pollutant, it is desirable that as much as possible be burned to carbon dioxide within the regeneration vessel 100. With unpromoted zeolite containing fluidized cracking catalyst in the regeneration zone dense phase fluidized catalyst bed, increased temperatures result in increased combustion of carbon monoxide to carbon dioxide such that at about 1350° F the carbon monoxide content of spent regeneration gas will be less than 1 percent by weight and preferably is less than about 200 parts per million weight (ppmw) under regeneration conditions employed herein. When catalysts promoted for combustion of carbon monoxide to carbon dioxide are employed, essentially complete combustion of carbon monoxide to carbon dioxide may be obtained at substantially lower temperatures in the range of about 1250° F. In the event that combustion of carbon monoxide in the dense phase fluidized bed is incomplete and substantial amounts of carbon monoxide are present in spent regeneration gas entering the second regeneration zone, secondary regeneration gas, sufficient to provide from about 1 to about 10 mole percent of the stoichometric amount of oxygen required for complete combustion of the coke on spent catalyst, is introduced into the dilute phase of spent regeneration gas catalyst suspended in secondary regeneration gas distribution means 112 at an elevation within said second regeneration zone such that the superficial velocity of the regeneration gas flowing upward therethrough does not exceed about 3.0 feet per second. This additional oxygen injected into the dilute phase promotes substantially complete combustion of carbon monoxide to carbon dioxide in the second regeneration zone. The portion of catalyst entrained in the spent regeneration gas which falls back to the upper surface of the dense phase fluidized catalyst bed from the second regeneration zone under the influence of gravity carries a substantial amount of the heat generated from the combustion of CO to $CO_2$ back to the dense phase fluidized catalyst bed, such that the temperature of the dilute phase does not increase above the temperature at which the entrained catalyst will be deactivated (e.g. preferably does not exceed about 1450°).

In the present invention, the dilute phase comprising spent regeneration gas and catalyst entrained therein, having carbon monoxide essentially completely burned to carbon dioxide, exits the top of said second regeneration zone, at superficial vapor velocity in the range of about 1.0–2.2 ft/sec into a third regeneration zone contained within upper regeneration section 102. From said third regeneration zone spent regeneration gas and entrained catalyst flow into a catalyst-gas separation zone wherein spent regeneration gas is essentially completely separated from said entrained catalyst. From said separation zone spent regeneration gas essentially free of entrained catalyst flows through vent means for removal from the regeneration process as a flue gas.

Catalyst, at a temperature of about 1050°–1450° F, from the bottom of said separation zone is returned to the lower portion of said first regeneration zone via a line 114, whereupon said hot separated catalyst is intimately mixed with spent catalyst and primary regeneration gas entering said first regeneration zone for increasing the temperature therein such that combustion of coke is enhanced.

Thus, having described herein the apparatus of the present invention, and having described a method of using the apparatus, it is to be understood that no undue restriction be imposed by reason thereof, and that only such limitations are to be imposed as are contained in the appended claims.

We claim:

1. In a fluidized cracking catalyst regeneration process wherein a spent, coke-contaminated cracking catalyst is contacted with a molecular oxygen containing regeneration gas, in a single regeneration vessel, at catalyst regeneration conditions, for burning substantially all the coke from said spent catalyst, producing a spent regeneration gas comprising carbon dioxide and carbon monoxide and substantially depleted in oxygen, and a hot regenerated catalyst substantially reduced in residual carbon suitable for cracking a hydrocarbon charge; the improvement which comprises:
   a. contacting, in the bottom of a frustoconical first regeneration zone, having a closed bottom and an open top spent catalyst with an amount of molecular oxygen containing primary regeneration gas sufficient to provide about the stoichometric amount of oxygen for complete combustion of coke under turbulent flow conditions for forming an intimate mixture of spent catalyst and primary regeneration gas;
   b. flowing said mixture of spent catalyst and primary regeneration gas upward, at catalyst regeneration conditions, at superficial vapor velocities of about 5–8 ft/sec near the bottom decreasing to about 2.5–4.5 ft/sec at the top of said first regeneration zone, for forming a fluidized dense phase bed of catalyst having an upper surface within said first regeneration zone;
   c. withdrawing hot, regenerated catalyst from the upper portion of said fluidized dense phase catalyst bed for use in cracking hydrocarbon charge stock;
   d. disengaging spent regeneration gas containing entrained catalyst from the upper surface of said fluidized dense phase catalyst bed;
   e. flowing said spent regeneration gas and entrained catalyst from the open top of said first regeneration zone into the bottom of a frusto-conical second regeneration zone, having an open top and open bottom in open communication with the top of said first regeneration zone, at a superficial vapor velocity in the range of about 2.5–4.5 ft/sec at the bottom decreasing to about 1.0–2.2 ft/sec at the top of said second regeneration zone such that a major portion of the entrained catalyst returns under the influence of gravity to the upper surface of said fluidized dense phase catalyst bed, and a dilute phase of catalyst suspended in spent regeneration gas exits the top of said second regeneration zone;
   f. radially distributing a molecular oxygen containing secondary regeneration gas into said second regeneration zone in an amount to provide the equivalent of about 1–10 percent of the oxygen in said primary regeneration gas for combusting substantially all the carbon monoxide in said spent regeneration gas to carbon dioxide;
   g. separating, in a separation zone, said dilute phase into a hot catalyst fraction and a flue gas fraction essentially free of entrained catalyst;
   h. venting said flue gas fraction from the regeneration process;
   i. flowing said hot, separated catalyst fraction from the separation zone to the bottom of the first regeneration zone for contact with additional spent catalyst and primary regeneration gas.

2. The process of claim 1, wherein catalyst undergoing regeneration is maintained in said fluidized dense phase catalyst bed, at a temperature in the range of about 1050°–1400° F, at a pressure in the range of about 15–50 psig at the top of said fluidized bed, for a period in the range of about 3–20 minutes sufficient to provide a specific coke burning rate of about 0.1–1 lb coke/hr/lb catalyst, for reducing the carbon remaining on regenerated catalyst to about 0.1 wt. percent or less.

3. The process of claim 2, wherein substantially all the carbon monoxide in said spent regeneration gas is combusted to carbon dioxide in said second regeneration zone, and wherein a substantial amount of the heat of said carbon monoxide combustion is absorbed by said entrained catalyst and is transferred to said fluidized dense phase catalyst bed.

4. The process of claim 3 wherein the dilute phase exiting the top of said second regeneration zone enters a cylindrical third regeneration zone, having an open bottom and closed top, at a space velocity in the range of about 1.0–2.2 ft/sec and a temperature in the range of about 1250°–1450° F, and wherein said dilute phase from said third regeneration zone enters said separation zone.

5. The method of claim 4 wherein residual carbon on regenerated catalyst is reduced to about 0.05 wt. percent or less and wherein carbon monoxide content of said spent regeneration gas is reduced to 500 ppm or less.

6. The method of claim 3 wherein a major portion of the heat of combustion absorbed by entrained catalyst is transferred to said fluidized dense phase bed, as said entrained catalyst settles under the influence of gravity.

7. The method of claim 1 wherein said primary regeneration gas and said secondary regeneration gas comprise air.

8. The method of claim 7 wherein said spent regeneration gas entering said second regeneration zone comprises carbon dioxide and carbon monoxide in a molar ratio of from about 1:1 to about 500:1 respectively, and wherein a major portion of carbon monxoide in said spent regeneration gas is combusted to carbon dioxide.

* * * * *